(12) United States Patent
Backmann et al.

(10) Patent No.: US 10,611,054 B2
(45) Date of Patent: Apr. 7, 2020

(54) OVERTURNING DEVICE FOR OVERTURNING MOLTEN MATERIAL AND PURGING METHOD

(71) Applicant: Windmöller & Hölscher KG, Lengerich (DE)

(72) Inventors: Martin Backmann, Lengerich (DE); Hermann-Josef Jäckering, Emsbüren (DE); Markus Bussmann, Essen (DE); Bernd Liesbrock, Lengerich (DE); Karsten Golubski, Haltern am See (DE)

(73) Assignee: Windmöller & Hölscher KG, Lengerich (DE)

( * ) Notice: Subject to any disclaimer, the term of this patent is extended or adjusted under 35 U.S.C. 154(b) by 321 days.

(21) Appl. No.: 15/508,186

(22) PCT Filed: Sep. 2, 2015

(86) PCT No.: PCT/EP2015/069995
§ 371 (c)(1),
(2) Date: Mar. 2, 2017

(87) PCT Pub. No.: WO2016/034603
PCT Pub. Date: Mar. 10, 2016

(65) Prior Publication Data
US 2017/0282408 A1    Oct. 5, 2017

(30) Foreign Application Priority Data

Sep. 3, 2014    (DE) .................. 10 2014 112 715

(51) Int. Cl.
*B29C 48/00*    (2019.01)
*B29B 7/32*    (2006.01)
(Continued)

(52) U.S. Cl.
CPC .............. *B29B 7/325* (2013.01); *B01F 5/064* (2013.01); *B01F 5/0641* (2013.01);
(Continued)

(58) Field of Classification Search
CPC ..... B29C 48/326; B29C 48/362; B01F 5/064; B01F 5/0641; B01F 5/0642; B01F 5/0643; B01F 5/0644; B01F 5/0645; F15D 1/02
See application file for complete search history.

(56) References Cited

U.S. PATENT DOCUMENTS

| 1,637,697 | A | * | 8/1927 | Jacobsen | ............... B01F 5/0644 |
| | | | | | 366/336 |
| 3,128,794 | A | * | 4/1964 | Boucher | .................. F15D 1/02 |
| | | | | | 138/37 |

(Continued)

FOREIGN PATENT DOCUMENTS

| DE | 6752197 | 2/1969 |
| DE | 1956459 | 5/1971 |

(Continued)

OTHER PUBLICATIONS

Internationaler Recherchenbericht und der Schriftliche Bescheid der International Recherchenbehörde [International Search Report and the Written Opinion] dated Nov. 23, 2015 From the International Searching Authority Re. Application No. PCT/EP2015/069995 and Its Translation of Written Opinion Into English. (16 Pages).

(Continued)

*Primary Examiner* — Timothy Kennedy (57) ABSTRACT

The present invention relates to an overturning device (10) for overturning a molten material (200) in a melt channel (110) comprising a melt inlet (20) and a melt outlet (30) wherein between the melt inlet (20) and the melt outlet (30) at least one melt guidance means (40) is assembled for a rearrangement of the molten material (200) from the center (Continued)

(22) of the melt inlet (20) to the edge (34) of the melt outlet (30) and for rearrangement of the molten material (200) from the edge (24) of the melt inlet (20) into the center (32) of the melt outlet (30).

16 Claims, 8 Drawing Sheets (51) Int. Cl.
| | |
|---|---|
| B29C 48/10 | (2019.01) |
| B29C 48/27 | (2019.01) |
| B29C 48/36 | (2019.01) |
| B29C 48/70 | (2019.01) |
| B29C 48/25 | (2019.01) |
| B29B 7/80 | (2006.01) |
| B29C 48/275 | (2019.01) |
| B29C 48/32 | (2019.01) |
| B01F 5/06 | (2006.01) |
| F15D 1/02 | (2006.01) |

(52) U.S. Cl.
CPC .......... *B01F 5/0642* (2013.01); *B01F 5/0643* (2013.01); *B01F 5/0644* (2013.01); *B01F 5/0645* (2013.01); *B29B 7/802* (2013.01); *B29C 48/0018* (2019.02); *B29C 48/10* (2019.02); *B29C 48/2692* (2019.02); *B29C 48/27* (2019.02); *B29C 48/277* (2019.02); *B29C 48/32* (2019.02); *B29C 48/362* (2019.02); *B29C 48/705* (2019.02); *F15D 1/02* (2013.01); *B29C 48/256* (2019.02); *Y02P 70/263* (2015.11)

(56) References Cited

U.S. PATENT DOCUMENTS

| | | | | |
|---|---|---|---|---|
| 3,182,965 | A * | 5/1965 | Sluijters | D01D 1/065 366/340 |
| 3,470,912 | A * | 10/1969 | Bydal | F16L 55/00 138/37 |
| 3,470,913 | A * | 10/1969 | Booy | F15D 1/02 138/37 |
| 3,470,914 | A * | 10/1969 | Smith | F15D 1/02 138/39 |
| 3,506,244 | A * | 4/1970 | Strang | B01F 5/0641 366/337 |
| 3,791,414 | A * | 2/1974 | Anand | F15D 1/02 138/37 |
| 3,911,073 | A | 10/1975 | Charles-Massance | |
| 4,363,552 | A * | 12/1982 | Considine | B01F 5/064 366/340 |
| 2003/0007419 | A1 | 1/2003 | Goebel et al. | |
| 2005/0037220 | A1* | 2/2005 | Smith | B29C 48/76 428/523 |
| 2007/0263486 | A1* | 11/2007 | Suhner | B01F 5/0643 366/337 |
| 2011/0001267 | A1 | 1/2011 | Demin et al. | |

FOREIGN PATENT DOCUMENTS

| | | | |
|---|---|---|---|
| DE | 2006941 | 8/1971 | |
| DE | 2129971 | 5/1972 | |
| DE | 2128874 A1 * | 1/1973 | ............... F15D 1/02 |
| DE | 2428321 | 1/1976 | |
| DE | 3245084 | 6/1984 | |
| DE | 3517793 | 12/1985 | |
| DE | 10027653 | 12/2001 | |
| DE | 10027653 A1 * | 12/2001 | ............... D01D 1/06 |
| EP | 0113041 | 7/1984 | |
| EP | 0816047 | 1/1998 | |
| EP | 0887172 | 12/1998 | |
| JP | 2011-235546 | 11/2011 | |
| WO | WO 2004/004875 | 1/2004 | |

OTHER PUBLICATIONS

Internationaler Vorläufiger Bericht zur Patentierbarkeit [International Preliminary Report on Patentability] dated Nov. 21, 2016 From the Internationalen Vorläufigen Prüfung Beauftragte Behörde [International Preliminary Examining Authority] Re. Application No. PCT/EP2015/069995 and Its Translation Into English. (23 Pages).

Prüfungsantrag [Examination Report] dated Mar. 27, 2015 From the Deutsches Patent- und Markenamt [German Patent and Trademark Office] Re. Application No. 102014112715.3 and Its Translation Into English. (12 Pages).

* cited by examiner

OVERTURNING DEVICE FOR OVERTURNING MOLTEN MATERIAL AND PURGING METHOD

RELATED APPLICATIONS

This application is a National Phase of PCT Patent Application No. PCT/EP2015/069995 having International filing date of Sep. 2, 2015, which claims the benefit of priority of German Patent Application No. 10 2014 112 715.3 filed on Sep. 3, 2014. The contents of the above applications are all incorporated by reference as if fully set forth herein in their entirety.

The present invention relates to an overturning device for overturning a molten material in a melt channel, a blow head for performing of a blow head extrusion method and a method for performing a purge process in an extrusion device.

FIELD AND BACKGROUND OF THE INVENTION

It is known that extrusion devices are used in order to generate a plastic melt. This plastic melt can be continued to be used in different manners. Thus, it is for example possible to introduce the molten material in a cavity of an injection molding device in order to generate corresponding components by injection molding. Likewise, it is known that the molten material is provided for a so called blow extrusion method with which a blow film is extruded. In all cases it is necessary that at the end of the extruder the liquefied molten material is transported to the respective place of usage via corresponding melt channels. These channels can be arbitrary complex and can be particularly separated to single channels.

It is a disadvantage with known solutions of extrusion devices that they comprise a high effort for the change of material. Thus, a so called purge process has to be performed in case a change of material should occur from a first molten material to a second molten material. In case for example with a blow extrusion device a certain time a product is produced with a blue film color and subsequently a change to a transparent film color is desired initially the blue film color and the corresponding molten material has to be purged from the single melt channels. Herefore, the extrusion device is already operated with the following material until the largest part of the molten material is purged out.

Since with melt channels in the edge area of these melt channels the transport speed is mainly equal to zero the old molten material so to say sticks the purge process time consuming. With blow extrusion devices with a throughput of up to approximately 120 kg molten material per hour thereby a purge process normally takes 20 minutes until 1.5 hours. For each film layer for which a change of material should occur, this accordingly leads to 120 kg or more waist material. With multiple film layers this amount is multiplied with the amount of film layers, even if only one single film layer is purged. Therewith, waist rates of up to 1,000 kg can be reached. Simultaneously, the purge time comprises a dead time for the machine in which no usable production can occur. Accordingly, the known extrusion device with the corresponding purge method is afflicted with significant disadvantages concerning the time effort and concerning the resulting costs and the waist material.

SUMMARY OF THE INVENTION

It is the object of the present invention to at least partially avoid the previous described disadvantages. Particularly it is the object of the present invention to reduce the time for the purge process in a cost efficient and simple manner.

Said object is solved by an overturning device with the features of claim 1, a blow head with the features of claim 14 and a method with the features of claim 15. Further features and details of the invention result from the dependent claims, the description and the drawings. Thereby, features and details which are described in connection with the overturning device according to the invention naturally also occur in connection with the blow head according to the invention and the method according to the invention and vice versa, so that according to the disclosure of the single aspects of the invention it can always be reciprocally related to.

An overturning device according to the invention serves for overturning a molten material in a melt channel. Herefore, the overturning device comprises a melt inlet and a melt outlet, wherein between the melt inlet and the melt outlet at least one melt guidance means is assembled. The melt guidance means serves for rearranging the molten material from the center of the melt inlet at the edge of the melt outlet. Further, the melt guidance means is configured for a rearrangement of the molten material from the edge of the melt inlet into the center of the melt outlet.

By center of the melt channel thereby basically each area is to be understood that is spaced apart from the edge. Particularly, such a rearrangement occurs away from the edge. For example, the center of the melt outlet can comprise the whole melt outlet area in a distance of approximately 5 mm to the edge.

By an overturning device according to the invention a rearrangement of the molten material in the melt channel occurs automatically without movable parts by an active guidance with the help of melt guidance means. The overturning device can be inserted in the melt channel or can configure a part of the melt channel. Via the melt inlet a fluid-communicating connection to the melt channel is established, such that the molten material can flow into the overturning device via the melt inlet. Subsequent to passing the melt inlet the molten material is rearranged in a manner according to the invention via the melt guidance means. At the melt outlet the rearranged molten material leaves the overturning device and can flow further in the melt channel via the fluid-communicating connection.

According to the invention the melt guidance means are configured for rearranging the molten material. Thereby, two basic arrangement functionalities are provided. At the melt inlet the molten material is used from the center and guided to the edge of the melt outlet. Simultaneously, and via the same lengths a rearrangement of the molten material from the edge of the melt inlet and in the center of the melt outlet occurs. Therewith, the material from the center of the melt inlet is exchanged with the material from the edge of the melt inlet, such that at the melt outlet a complete rearrangement situation occurs.

An overturning device according to the invention significantly reduces the purge time by using an extrusion device. Thus, in a purge situation in the extrusion device it can be assumed that all molten material in the area of the edge of the melt channel remains longer than in the center. Thus, during the purge process relatively rapidly the center of the melt channel is filled with completely fresh and therewith new molten material while at the edge the high amount of old material remains. By the use of the overturning device according to the invention a rearrangement of this old material from the edge of the melt channel into the center of the melt channel occurs and therewith in the area of the fast and higher flow through quote. This leads to the fact that so to say old molten material in front of the overturning device is rearranged into the center of the melt channel after the overturning device, such that it can be faster transported away in the center. Thereby, that this rearrangement occurs in a manner according to the invention a significant reduction of the purge time can be achieved by a faster output of the old material of the melt channel.

Particularly, by an overturning device according to the invention a reduction of up to 50% of the whole purge time can be achieved. A further advantage is the reduction of the resistance time of the molten material at the edge in the normal operation. In this manner the thermal influence to the material can be reduced, wherein the material influence is reduced or even avoided.

The overturning device can thereby be inserted in the melt channel or can configure the melt channel. Naturally, in the melt channel two or more overturning device can be provided in a defined distance. It is preferred, like it is subsequently described, when the overturning device according to the length of a melt channel is assembled mainly in the center of a melt channel.

The melt guidance with help of the melt guidance means can thereby be configured in different manners. Thus, the subsequently described functions of a separation can be likewise provided by a melt guidance means, like this is possible by active guidance channels within the melt channel. These two different overturning functionalities are subsequently described in details.

Thus, it can be an advantage when with the overturning device according to the invention the at least one melt guidance means comprises a first guidance channel with a guidance opening in the center of the melt inlet and at least one guidance outlet at the edge of the melt outlet. Here, an active turning within the single melt channel occurs, such that an installation of a separate overturning device in the existing geometry of the melt channel is possible. By installation of the guidance opening now the new or fresh material of the molten material is guided to the edge and is outputted via the guidance outlet at the melt outlet. There it replaces the situated old molten material in the center, such that by a passive shifting a complete rearrangement is achievable. Naturally, also a movement of the old molten material from the edge can occur actively from the edge to the center, like this is described by a second guidance channel in the subsequent paragraph. By a guidance channel a completely closed channel can be understood. However, likewise laterally opened guidance channels in form of so called slides or ramps can be understood in the sense of the present invention. Accordingly, the guidance openings and the guidance outlet can comprise a completely enclosing geometry or can be configured with lateral opening.

A further advantage is when with the overturning device according to the previous paragraph the at least one melt guidance mean comprises a second guidance channel with a guidance outlet in the center of the melt outlet and at least one guidance opening at the edge of the melt inlet. Therewith, the second guidance channel so to say serves for the inverse functionality like the first guidance channel. Via the guidance opening now the molten material and therewith the old material of the molten material can be absorbed from the edge of the melt inlet and actively guided with the second guidance channel into the center of the guidance outlet at the melt outlet. Therewith, not only by replacing but by active guiding a rearrangement according to the invention from the edge to the center and from the center to the edge is possible. The combination of two guidance channels is thereby preferably provided parallel, such that the guidance opening of the first guidance channel and the guidance opening of the second guidance channel are assembled in the same or mainly the same position at the overturning device in flowing direction. Simultaneously, it is an advantage when with the guidance outlet the first guidance channel and the guidance outlet of the second guidance channel in relation to the flow direction at the same or mainly the same position at the melt outlet are assemble. Likewise, it is an advantage when all guidance channels of the at least one melt guidance means comprise the same or mainly the same free flow area, in order to ensure a clean rearrangement, particularly with a defined volume flow. Thereby, the single flow areas are preferably configured in order to provide the same or mainly the same flow velocities. Therewith, an undesired rupture of single layers for one another is prevented with a higher probability and therewith with a higher security.

A further advantage is when with overturning device according to the invention the guidance opening of the second guidance channel is connected fluid-communicating with a ring collector, which is assembled mainly at the entire perimeter of the melt inlet. A ring collector is a constructive configuration, which enables to at least partially include the circumferential flowing molten material at the edge of the melt inlet. This leads to the fact that a single decentral guidance opening of the second guidance channel is sufficient in order to at least to the partial perimeter, preferably to the full perimeter inside the molten material and guide to a guidance opening. Naturally, the ring collector can be combined with two or multiple guidance openings, such that only part of the perimeter has to be bypassed. In order to preferably mainly automatically ensure the guidance function the guidance opening is assembled subsequently to the beginning of the ring collector, particularly, in flow direction of a molten material. Thereby, it has to be understood that by the flow of the molten material initially in a first section a ring collector is accepted and that by the further movement at this ring collector a guidance opening slides or is transmitted. This offset in axial direction or in flow direction enables a reduction of the constructive effort of the whole overturning device. The ring collector is thereby able to partially configure the guidance opening. Thus, it is possible that the guidance opening merges into the ring collector or vice versa.

It is a further advantage when with an overturning device according to the invention the ring collector comprises a collection width which is larger than the opening width of the guidance opening of the second guidance channel. This leads to fluidic advantages. Thus, the edge layer is inserted into the ring collector with a greater distance to the edge of the melt inlet and subsequently the narrowing configuration of the ring collector to the guidance opening is accelerated. This leads to an improved flow performance by the narrowing of the cross section of the guidance opening and particularly to a reduction of the pressure loss of the whole system. Simultaneously, by the influencing of the flowing it is ensured that at the outlet edge at the side of the melt outlet high speed differences of the combined flows are avoided. Layer rupture is avoided at this position with a high probability, such that the whole production can be operated with a higher speed and simultaneously with a higher quality.

It can be a further advantage when with the overturning device according to the invention a guidance outlet of the first guidance channel is fluid-communicating connected with a ring distributor, which is assembled fully at the entire perimeter of the melt outlet. The ring distributor is preferably concerning its geometric configuration identical or mainly identical to the ring collector. The ring distributor mainly fulfilled the same function as the ring collector. However, the ring distributor serves for the fact that the guided molten material is distributed to the edge. Therewith, the ring distributor is preferably downstream to the guidance outlet preferably axially in flow direction. As the molten material leaves the first guidance channel of the guidance outlet the ring distributor takes over the corresponding distribution about the edge of the melt outlet. This leads to the advantage that in the melt outlet a single guidance outlet is sufficient in order to provide a great part of the perimeter or even the complete perimeter of the melt outlet for the rearrangement of the molten material. Thereby, preferably a distance between the guidance outlet and the edge of the ring distributor can be overcame ramp like, such that a continuous complete distribution of the molten material which is escaped from the guidance outlet can occur. Therewith, the same advantages like they are achieved by the ring distributor like they are already described in relation to the ring collector.

An overturning device according to the previous paragraph can be improved in that the ring distributor comprises a distributing width, which is greater than the opening width of the guidance outlet of the first guidance channel. Here, flow-technical optimizing is intended, like it is already described in a similar of identical manner to the ring collector. The expansion of the opening width starting from the guidance outlet to the distributing width reduces the flow speed of the molten material in the ring distributor, such that now for the merging of the different layers between the guidance outlets of the guidance channels different systems and speed of the flow are reduced or completely prevented. This leads to a reduced probability of a layer rupture with a combination in the melt outlet for the layers. Therewith, likewise the quality with the production and particularly with the conveying of the molten material is further improved. In this matter it is possible to work with a higher conveyance speeds and therewith with higher production speeds without risking a reduction in quality.

It is further an advantage when with an overturning device according to the invention the melt inlet, the melt outlet and at least one melt guidance means are configured with little dead space, particularly with no dead space. Dead spaces in the sense of the present invention are areas of the overturning device with very low flow speed, particularly a flow speed equaling zero. In other words these dead spaces can be configured for example by intersections in which the molten material is deposited and is not transported by further flows. The reduction of dead spaces or the avoidance of dead spaces in an overturning device according to the invention leads to further reduction of the purge time and particularly to a greater maintenance freedom of the overturning device itself. Particularly concerning the cleaning possibilities of the overturning device a reduction of dead spaces has a great advantage. Further, the dead spaces in form of undercuts can lead to undesired vortex formations in the flow of the molten material, wherein the little dead spaces or the freedom from dead spaces of the overturning device the flow can pass easier and therewith with a lower pressure loss through the overturning device.

It is further an advantage when with an overturning device according to the invention the diameter of the free flow area of the melt inlet and/or the melt outlet is in the following relation with the length of the overturning device in flow through direction:

1:1
40:50
32:40
20:30

The previous enumeration is a not limited enumeration. In general it is preferred when the relation is in the area between 1:1 and 1:5. Preferably, the relation is configured with approximately 1:1.25. The relation possibilities of the enumeration described optimized or ideal combinations concerning the length and the diameter of the free flow area. In other words on a possibly short length the reduction of the pressure loss with an improved rearrangement performance is ensured. Particularly, for the deflection it is necessary for the flow of the molten material in order to achieve the rearrangement with a shorter construction of the overturning device a larger deflection is necessary. Simultaneously, however, with a particularly long configuration of the overturning device a high pressure loss is a large flow length is generated. The previously described relation possibilities provide ideal compromise between a possibly short configuration of the overturning device concerning the adjusting pressure loss and a particularly soft deflection with a flow through for the deflection of the overturning device.

It is further an advantage when with an overturning device according to the invention between the melt inlet and the melt outlet in the area of the at least one melt guidance means an enlarged outer parameter is configured for a free flow cross section, in which at least one melt guidance means is configured which corresponds or mainly corresponds the free flow cross section in the melt inlet and/or the melt outlet. In other words the overturning device comprises a thickness increase or a diameter increase. This leads to the fact that between the melt inlet and the melt outlet no reduction of the free flow area occurs. By a free flow area within the sense of the present invention the cross section of the flown through component is to be understood, which at the free flow area is traversed to the flow direction of the molten material in this component. With a cylindrical pipe accordingly the free flow area of the circular inner cross section perpendicular to the cylinder axis of the cylindrical pipe. The extension of the outer diameter leads to the fact that between the melt inlet and the melt outlet in total a constant free flow cross section remains. In case the melt inlet and/or the melt outlet is preferably configured with the same or mainly the same flow cross section, like it is the case with assembled melt channel, thus, this leads to a constant or mainly constant free flow area for the whole melt channel. In total this manner the pressure loss by the overturning device according to the invention can be further minimized and accordingly the disadvantageous pressure loss can be significantly reduced by an overturning device according to the invention.

A further advantage can be achieved when with a overturning device according to the invention the first guidance channel and/or the second guidance channel in the course comprise a deflection section with a setting angle to the flow direction of the molten material in at least one melt guidance means of less than 90°, particularly in the area of approximately 70°. The lower the setting angle for the deflection section is configured the lower is the negative influence to the flow speed or the resulting flow resistance. The steeper the setting angle in the deflection section is chosen the shorter is the axial length of the flow direction for the construction of the overturning device. It is preferred in order to ensure a reduction of the pressure loss in an improved construction when the setting angle is chosen of less than 90°. In this manner it is possible to reduce undesired dead spaces or even completely avoid dead spaces. It is preferred within the sense of the present invention to provide a setting angle in the area of approximately 70°, particularly in the area between approximately 65° and approximately 75°. This leads to particularly compact and accordingly short construction of the overturning device and simultaneously to a negative influence of the flow speed by the resistance for the flow using the deflection section.

It is further an advantage when with an overturning device according to the invention with the at least one melt guidance is configured for an increase in pressure of the molten material about the sector in the area between approximately 5 and approximately 20. Like already described the overturning device comprises a flow obstacle for the molten material based on the geometric configuration, in detail the length and the installations of the overturning device is adjusted accordingly between the melt inlet and the melt outlet a pressure loss. According to the invention this pressure loss is limited to the factor of approximately 20 between the melt inlet and the melt outlet. It is preferred when the pressure loss is reduced to an optimum value in the area of approximately 5 as factor for the pressure loss between the melt inlet and the melt outlet. Therewith, naturally a material dependence is defined. Thus, the area between the factor approximately 5 and the factor approximately 20 is applicable to a single overturning device, such that the overturning device for the used different materials with different viscosities in the melt channel does not leave or mainly not leave this area of the factor for the pressure loss. This factor for the pressure increase relates to a comparison with a pipeline of the same length without the overturning device.

It is likewise an advantage when with the overturning device according to the invention the at least one melt guidance means, the melt inlet and/or the melt outlet at least partially are coated with a protective coating, particularly a corrosion protection coating, particularly comprising nickel. By flowing through with a highly viscous medium, particularly a melted plastic in form of a melt great friction forces result at the wall of the melt channel and therewith at the wall within the overturning device. In order to ensure particularly a high service life and particularly a small wearing of the overturning device, corrosion protection coatings are usable in order to reduce the friction at the walls and simultaneously increase the resilience of the material at the walls. The use of nickel has turned out as being particularly advantageous since in comparison between the costs and the use of material and for the applying of the corrosion layer here a high wear minimizing within the overturning device is achievable.

A further advantage can be when with the overturning device according to the invention the at least one melt guidance means and/or the melt inlet and/or the melt outlet particularly, the whole overturning device is produced by a constructing method. Particularly, so called 3-D printing methods or rapid prototyping methods are to be understood. Thus, for example by a layer wise construction any complex geometry can be generated. A possibility for such a constructing method is, for example, a layer wise laser sinthering from metal powder such that also complex forms which are only hardly achievable by casting processes can be produced in a cost-efficient and simple manner. Not least, a greater freedom of construction with single design and formations within the overturning device is permitted. Particularly, for an achieving of little dead space or no dead space areas within the overturning device a constructing method can comprise great advantages.

It is a further advantage when with the overturning device according to the invention a shifting device is intended for a shifting of the overturning device between a first position and a second position. In the first position, the melt inlet and the melt outlet are in a fluid communicating connection with the melt channel. In the second position, the melt inlet and the melt outlet are separated from the melt channel. Thereby, the shifting device can for example perform a movement of the overturning device in a translatory, rotatory or in a combined manner. Particularly, thereby, for the overturning device in the second position a pipe piece or a channel piece is provided which connects the both remaining edge sections of the melt channel in a fluid communicating manner. The shifting device enables the rearranging function so to say by switching on of the overturning device by insertion and switching off by extraction of the overturning device. Since the overturning device generates a corresponding pressure loss situation by its overturning functionality it is an advantage in the normal operation to switch off the overturning function. Therewith, an increased pressure loss only during the purge process is applied in order to ensure the corresponding rearrangement function. The increased pressure loss of the overturning device is switched off by the pushing out of the overturning device into the second position in the normal operation and accordingly cannot further disturb.

It is further an advantage when with the overturning device according to the invention the melt inlet and the melt outlet comprise a free flow area which corresponds or mainly corresponds to the free flow area of the melt channel. In other words, a continuous and without edges or variations of diameter a fluid communicating connection between the melt inlet and the melt outlet or between the melt outlet and the melt inlet is enabled. Such an overturning device can be completely inserted into the melt channel or can partly configure the melt channel. By a free flow area, thereby, the cross section perpendicular to the flow of the respective position is to be understood. In other words, the free flow area configures the flow cross section area via which the volume stream of the molten material flows.

It is further an advantage when with the overturning device according to the invention the free flow area of the melt guidance means corresponds or mainly corresponds to the free flow area of the melt inlet and/or of the free flow area of the melt outlet. Particularly, this embodiment is combined with the embodiment according to the previous paragraph. The free flow area of the melt guidance means is thereby, preferably, the amount of all melt guidance means. By this correspondence, a constant free flow area is provided such that the pressure loss is avoided or mainly avoided by cross section narrowings. This significantly reduces the adjusting pressure loss by flowing through with molten material. A pressure loss remains exclusively or mainly exclusively which is generated by the corresponding influence to the float direction and accordingly by the active rearrangement of the molten material. Thus, for example, an extension of the melt channel can allow such a geometric correlation in the area of the overturning device. Further, it is possible that during separation in a separation section a corresponding adjustment of the flow cross section by the corresponding diameter of the partial channels is provided.

Likewise, a subject matter of the present invention is a blow head for performing a blow head extrusion method. Such a blow head comprises at least a melt channel for the conveyance of molten material to a blow outlet of the blow head. A blow head according to the invention is characterized in that in the at least one melt channel at least an overturning device according to the present invention is assembled. Therewith, a blow head according to the invention comprises the same advantages like they are described in detail in relation to the overturning device according to the invention. The melt channel is thereby in a fluid communicating connection with the melt inlet and the melt outlet of the overturning device. Particularly, such a blow head with two or multiple melt channels for different layers of the blow film is provided. The overturning device is preferably assembled in the same or identical configuration assembled in all melt channels. In order to provide in a manner according to the invention the same purge time reduction for all melt channels.

A blow head according to the present paragraph can be further improved in that the overturning device related to the length of the melt channel is assembled in the center or mainly in the center of the melt channel. Thereby, this is about an optimized positioning of the overturning device which ensures the maximal reduction of the purge time of about approximately 50%. Naturally, also two or multiple overturning devices are possible which preferably are used with the same or identical separation in the respective melt channel.

With a blow head according to the invention it is further possible that with a combination of two or multiple overturning devices one after the other each overturning device only covers one part of the respective edge and therewith only rearranges the molten material into the center from this part of the edge. Thereby, preferably each overturning device can perform a rearrangement for another perimeter section such that after passing of all overturning devices molten material is rearranged from the entire edge into the center. For example, four overturning devices, one after the other, can cover respectively 90% of the perimeter of the edge within rearrangement functions such that the amount of the whole extend of 360° is rearranged.

A further subject matter of the present invention is a method for the performance of a purge process in an extrusion device, particularly in a blow head according to the present invention comprising the following steps:
  introducing of a molten material into a melt inlet of an overturning device, particularly according to the present invention,
  rearrangement of molten material from the center of the melt inlet to the edge of the melt outlet of the overturning device, and
  rearrangement of the molten material from the edge of the melt inlet into the center of the melt outlet.

A method according to the invention comprises the same functionalities according to the invention like the overturning device according to the invention such that the same advantages can be achieved like they are described in detail in relation to the overturning device according to the invention.

Naturally, a blow head according to the invention and a corresponding overturning device can be used in other extrusion units, for example, in a film extrusion, particularly in a flat film extrusion. Thereby, the blow head can be basically configured as an extrusion head.

BRIEF DESCRIPTION OF THE SEVERAL VIEW OF THE DRAWINGS

Further advantages, features and details of the invention result from the subsequent description in which embodiments of the invention are described in detail in relation to the drawings. Thereby, the features described in the claims and in the description can be essential for the invention each single by themselves or in any combination. It is shown schematically:

DESCRIPTION OF SPECIFIC EMBODIMENTS OF THE INVENTION

Figure 1:
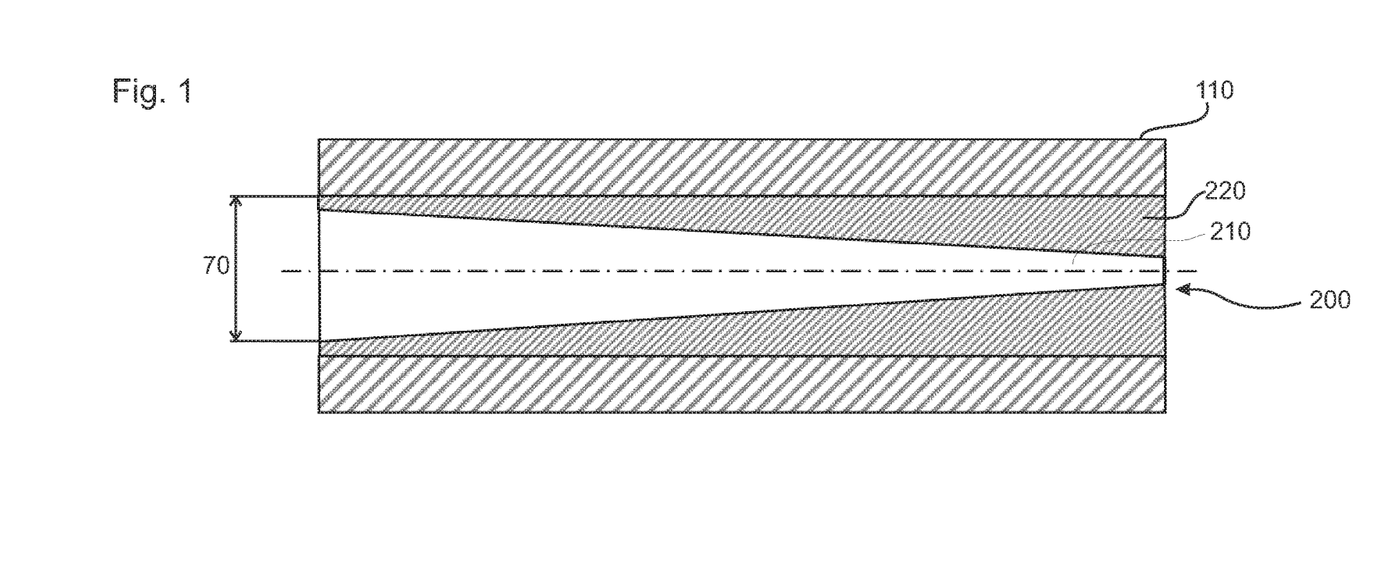
FIG. 1 A schematic representation during a purge process with a known extrusion device, FIG. 2 A situation according to FIG. 1 with the use of an overturning device according to the invention, FIG. 3 An embodiment of an overturning device according to the invention, FIG. 4 An embodiment of FIG. 3 with a further representation of flow conditions of the molten material, FIG. 5 The embodiment of FIG. 3 and FIG. 4 with further dimensions, FIG. 6 A further embodiment of an overturning device according to the invention, FIG. 7 A further embodiment of an overturning device according to the invention, FIG. 8 A further embodiment of an overturning device according to the invention, FIG. 9 A further embodiment of an overturning device according to the invention, FIG. 10 The embodiment of FIG. 9 in a further representation, FIG. 11 An embodiment of a blow head according to the invention.

In FIG. 1 a melt channel 110 with a flow direction from left to the right is shown like it is presented during the purge process. Within the melt channel 110 a free flow area 70 is provided through which molten material 200 is flowing. Here, it has to be differentiated between old molten material 220 and new molten material 210. It can be recognized that via the longitudinal course of the melt channel 110 during the purge process a ramp like or cone like configuration between the old molten material 220 and the new molten material 210 is configure. This cone moves during the purge time in the course to the right until finally the greatest part of the old molten material 220 is put out and it can be further proceeded with the active production.

Figure 2:
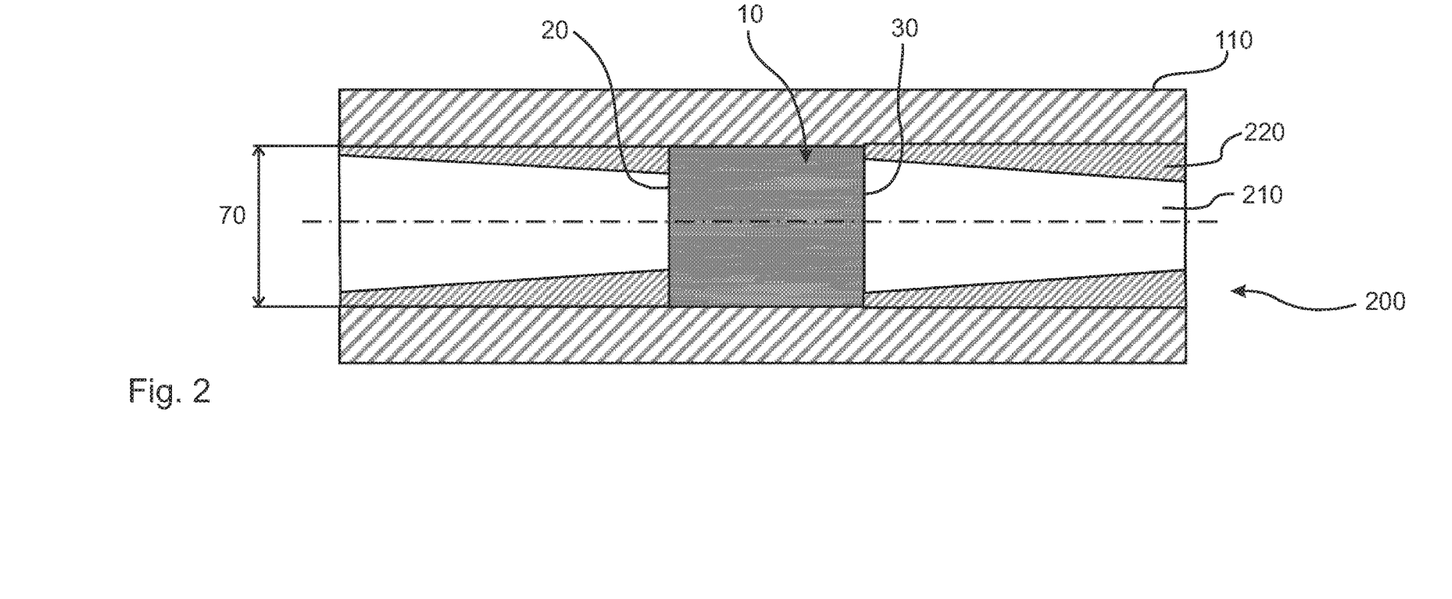

In FIG. 2 the mode of action of overturning device 10 according to the invention is shown. Here, a rearrangement from the edge of the molten material 200 into the center of the molten material 200 and vice versa occurs. At the melt inlet 20 of the overturning device 10 a corresponding material is received from the edge of the molten material 200 and provided in the center of the melt outlet 30. In an inverse manner, fresh or new molten material 210 is guided from the center at the melt inlet 20 to the edge of the melt outlet 30. Like it can be recognized therewith, the adjusting amount of old melt material 220 at the right edge of the melt channel 110 is reduced. The representation of FIG. 2 occurs at the same point of time during the purge process like in FIG. 1.

Figure 3:
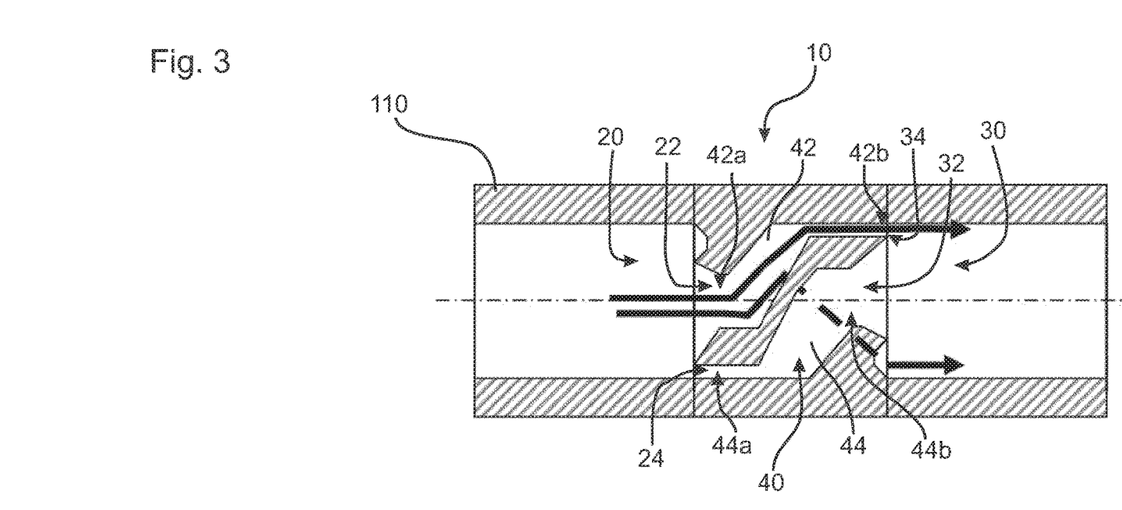
Figure 4:
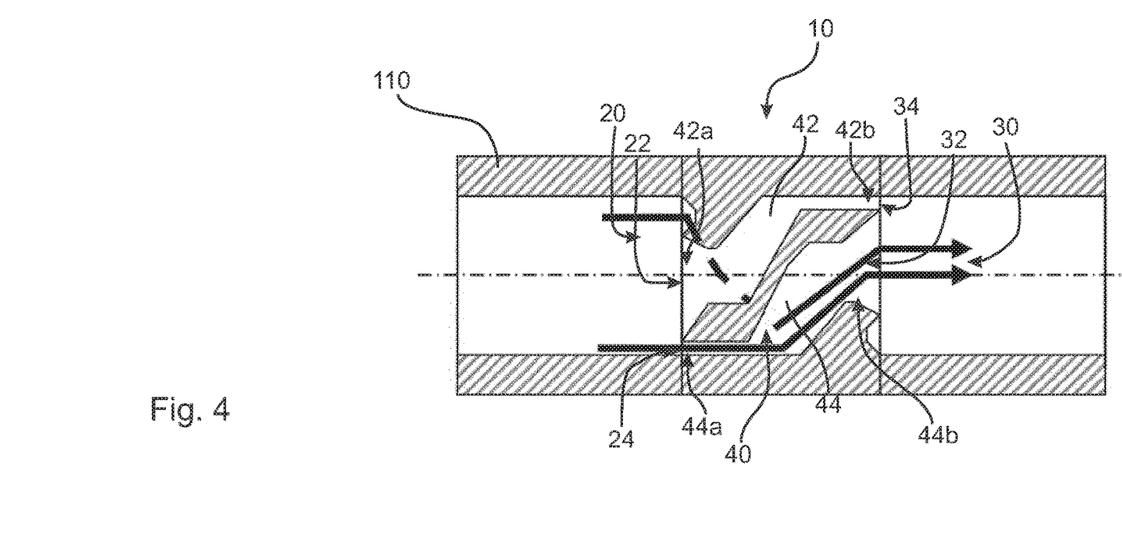

FIGS. 3 and 4 show a first embodiment of an overturning device 10 according to the invention. This overturning device 10 is configured with two guidance channels 42 and 44 as melt guidance means 40 via a ring collector not described in detail. A guidance opening 44a at the edge 24 of the melt inlet 20 is provided such that the corresponding molten material 200 can flow into the second guidance channel 44. This is shown by arrows in FIG. 4. Via a guidance outlet 44b in the center 32 of the melt outlet 30 now the rearrangement from the edge into the center occurs for this material of the molten material 200.

In the same manner, in the center 22 of the melt inlet 20 a guidance opening 42a of the first guidance channel 42 is provided which enables a rearrangement of the molten material 200 at the edge 34 of the melt outlet 30 and the corresponding guidance outlet 42b along the arrows of FIG. 3. Here, this is a technical solution using an active rearrangement wherein the overturning device 10 is part of the melt channel 110.

Figure 5:
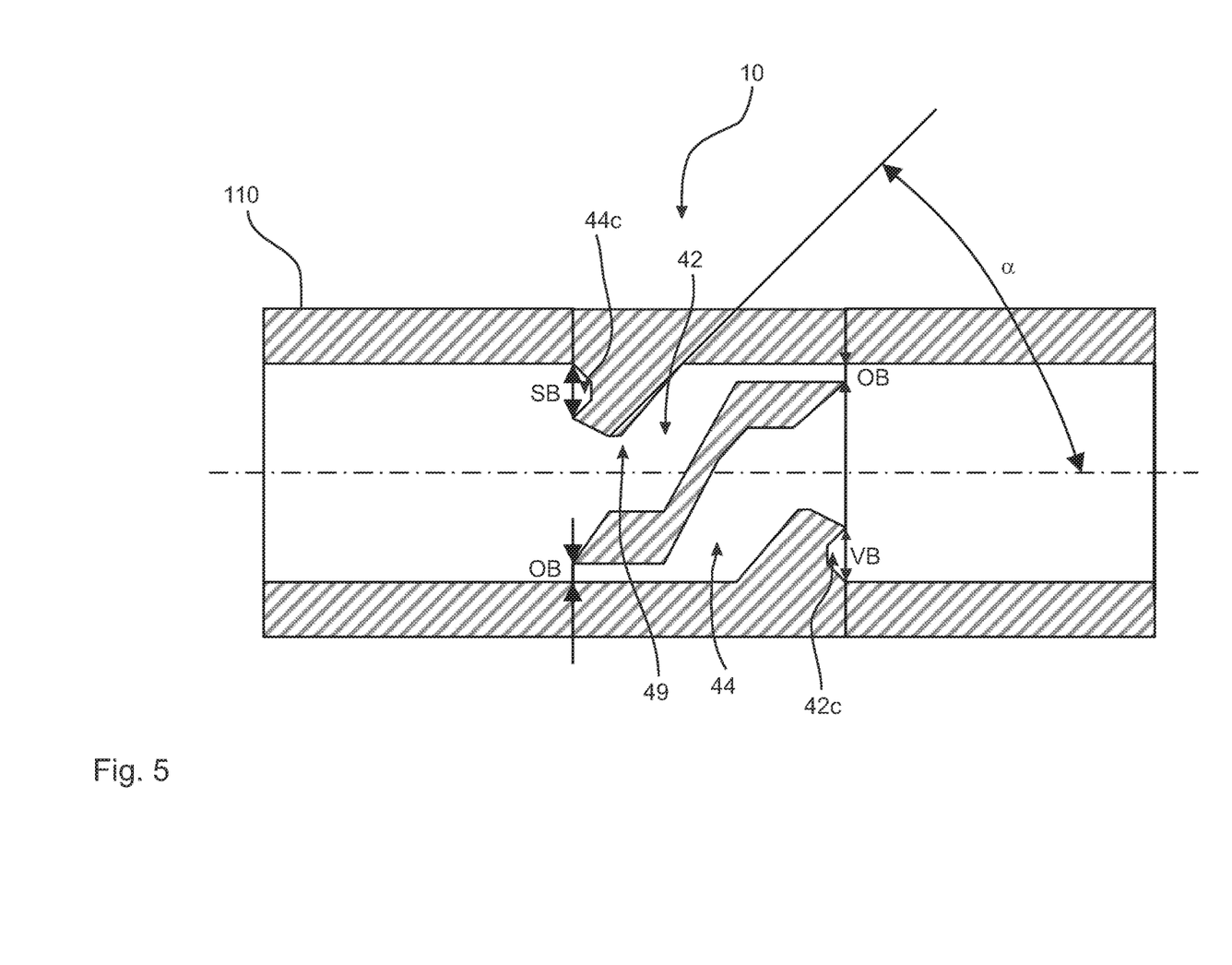
Figure 6:
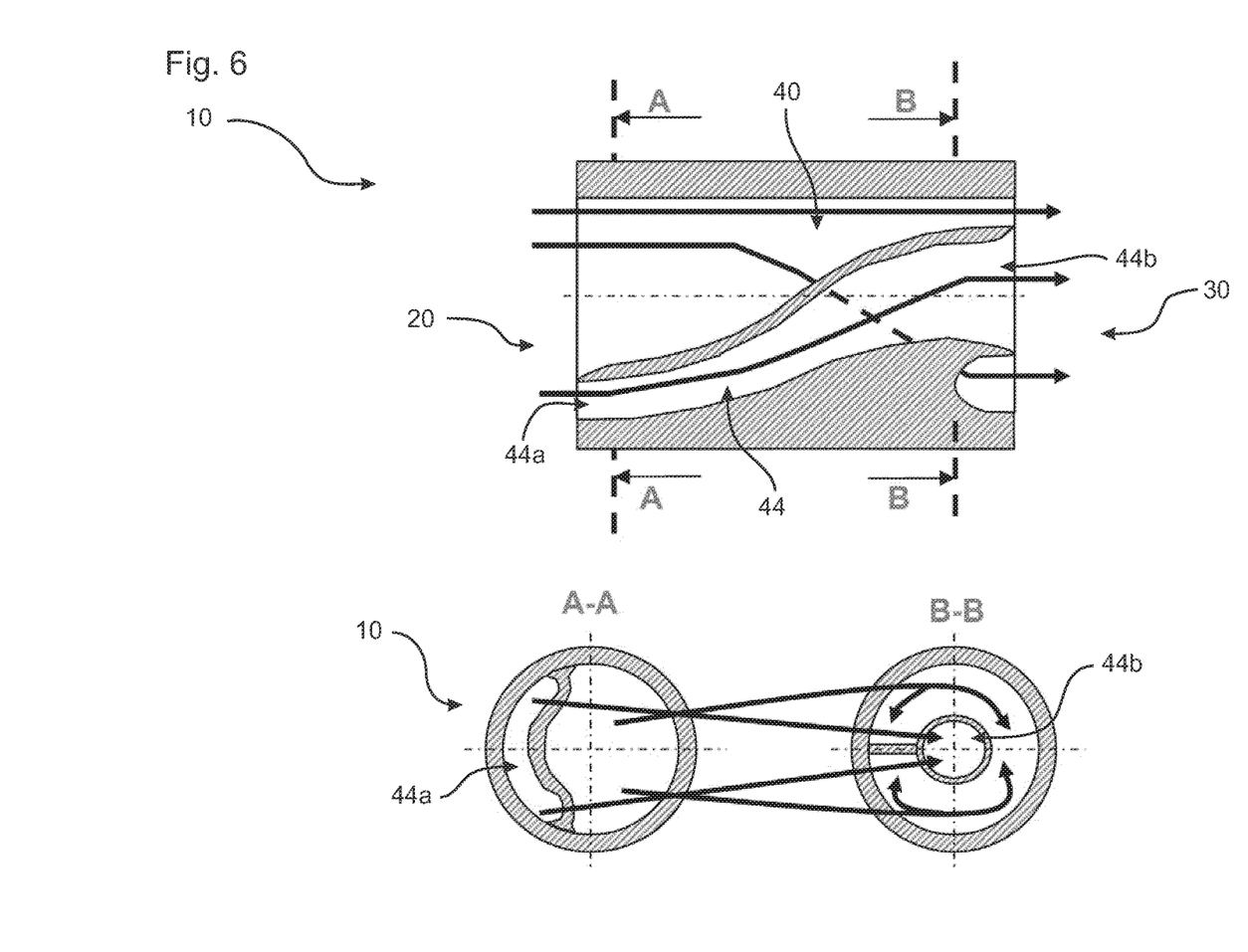

FIG. 6 shows a reduced complexity concerning the embodiment of FIG. 3 to FIG. 5. Here, only a close second guidance channel 44 is provided with the corresponding guidance opening 44a and guidance outlet 44b. The remaining material of the molten material 200 is untouched by the melt inlet 22 or is guided through at the upper edge through the melt guidance means 40 or guided to the lower edge. The corresponding sections AA and BB are shown in the lower area of FIG. 6 wherein likewise the arrows show the corresponding rearrangement movements.

FIG. 5 shows the embodiment of FIGS. 3 and 4 in a similar representation, however, with further details. Thus, here in the melt channel 110 the overturning device 10 is assembled. It can be well recognized that a single guidance opening 44a of the second guidance channel 44 is provided with an opening width OB which is in relation to a collective width SB of a ring collector 44c like follows. The collecting width SB is greater or the same, particularly, greater as the opening width OB in the same manner. The opening width OB of the guidance outlet 44b is smaller or equal, particularly smaller than the distribution width VB of the ring distributor 42c. With this embodiment it can be recognized that the ring collector 44c and the ring distributor 42c are merging into the guidance opening 44a or the guidance outlet 42b or are configured integrally with them.

Further, in FIG. 5 it can be seen that within the guidance channel 42 and 44 setting angles α are intended. The setting angle α of the first guidance channel 42 is configured approximately in the area of 70° such that a particularly complex construction of the overturning device can be achieved with a simultaneously possibly small influence to the flow conditions in the respective guidance channel 42 and 44.

Figure 7:
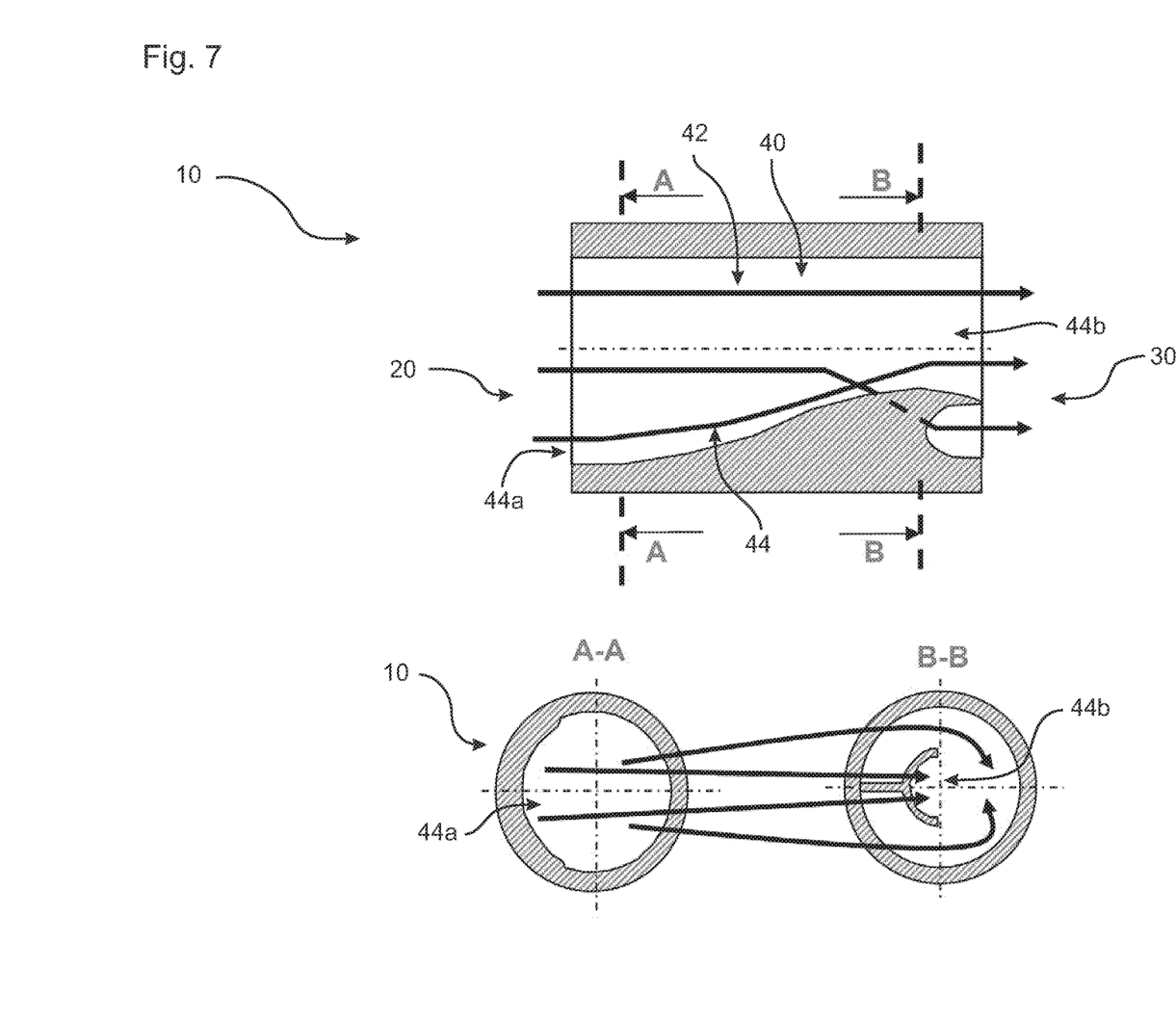

In FIG. 7 a further embodiment of an overturning device 10 according to the invention is shown. This is oriented on the embodiment of FIG. 6 wherein, however, here a second guidance channel 44 is open and configured as a ramp. This ramp like configuration comprises also a second guidance channel 44 which is configured open towards the upper side of the first guidance channel 42. This leads to a partial lateral opening of the guidance opening 44a and the guidance outlet 44b. The functionality concerning the rearrangement is, however, identical to the already described embodiment of the overturning device 10.

Figure 8:
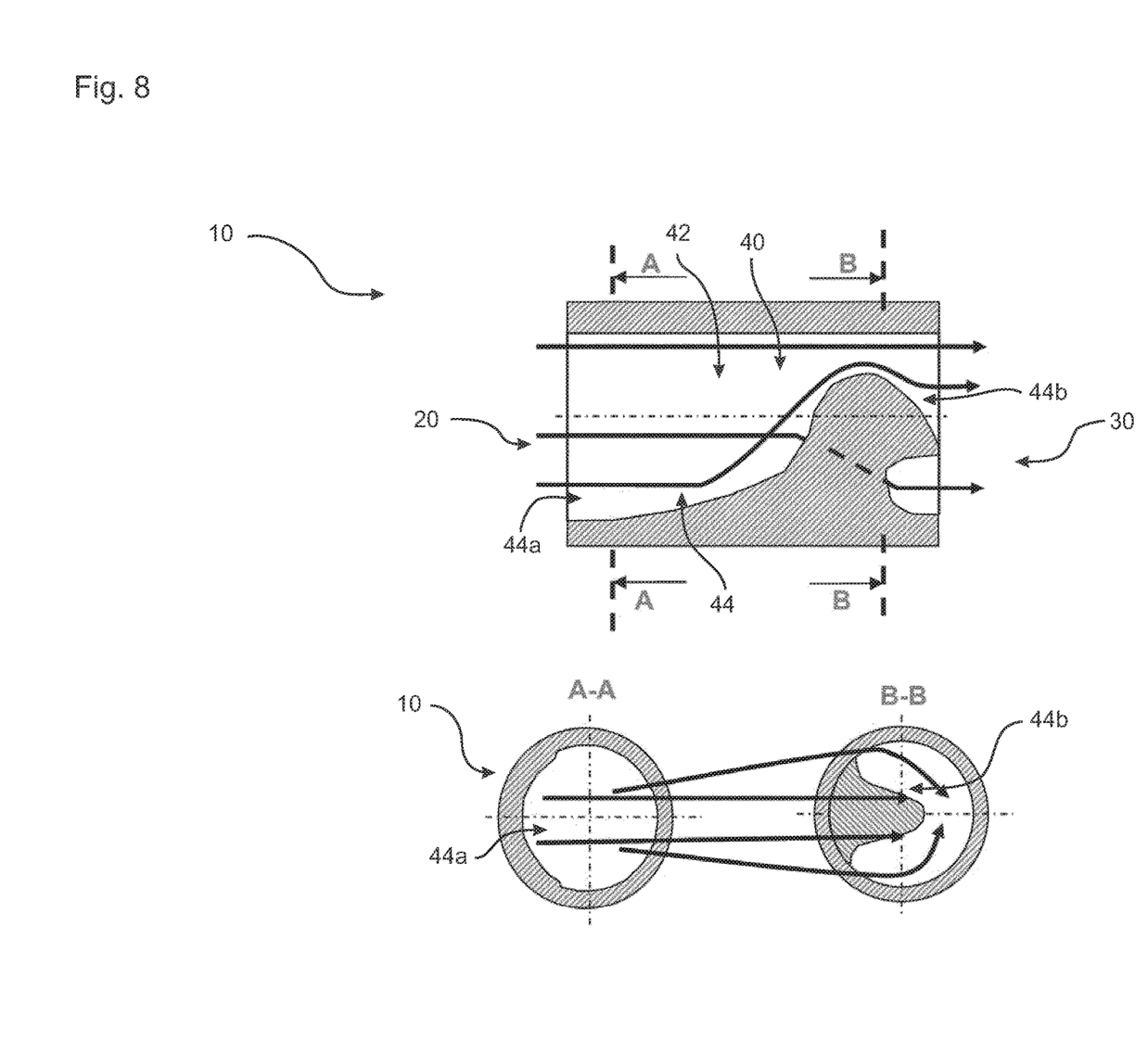

FIG. 8 shows a further embodiment of an overturning device 10 wherein here the guidance channel 44 is configured simplified and particularly configures the flow influencing for the rearrangement functionality in a fin shaped manner. Here, again, a second guidance channel 44 opened towards the upper side is intended with a corresponding guidance opening 44a opened to the other side and a guidance outlet 44b opened to the upper side. Likewise, it is indicated by arrows that a corresponding rearrangement of the molten material 200 is performed.

Figure 9:
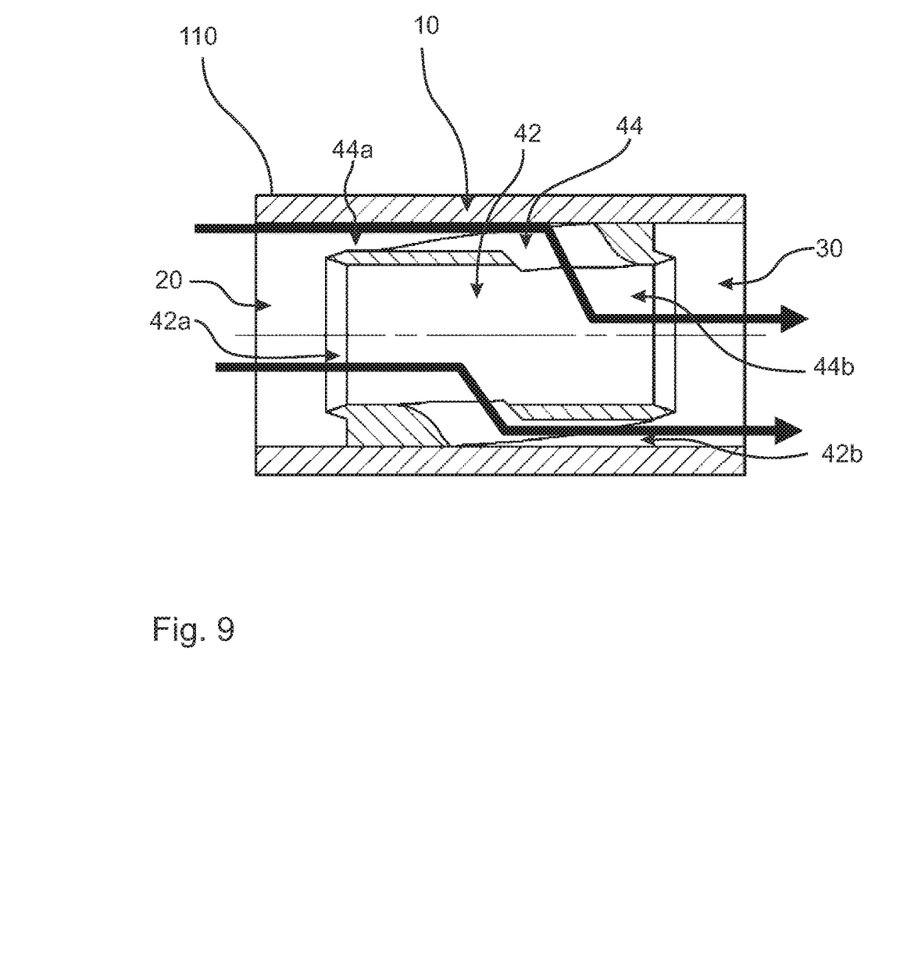
Figure 10:
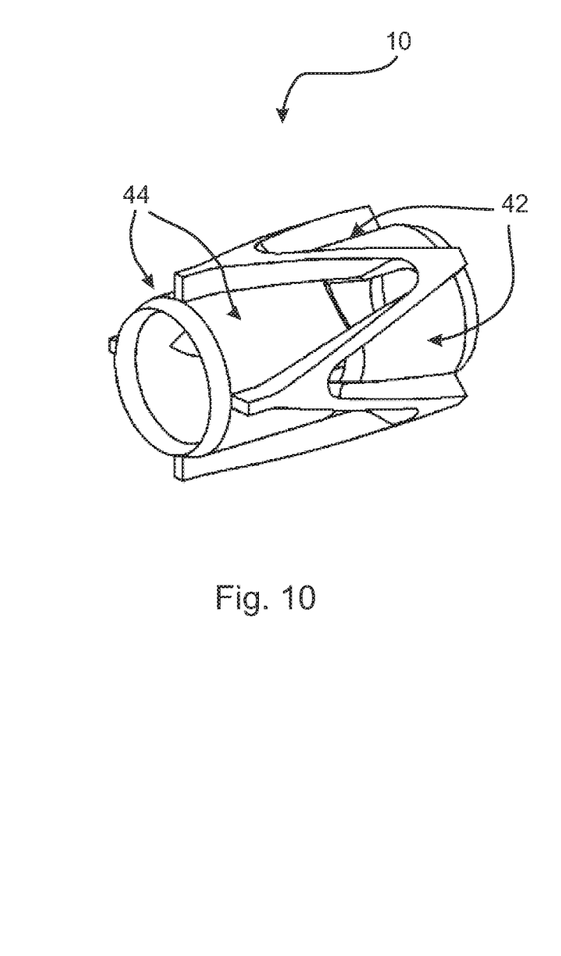

FIGS. 9 and 10 show a further embodiment of an overturning device 10 according to the invention. Hereby, this is an insertable overturning device 10 with a functionality. This corresponds to the already described embodiments of the overturning device 10. By the configuration as an insert therewith also an upgrading with an overturning device 10 according to the invention is possible in a simple and cost efficient manner. With this embodiment four second guidance channels 44 and accordingly also four first guidance channels 42 are provided. In FIG. 9 for this configuration with arrows likewise the flow path of the molten material 200 are shown.

Figure 11:
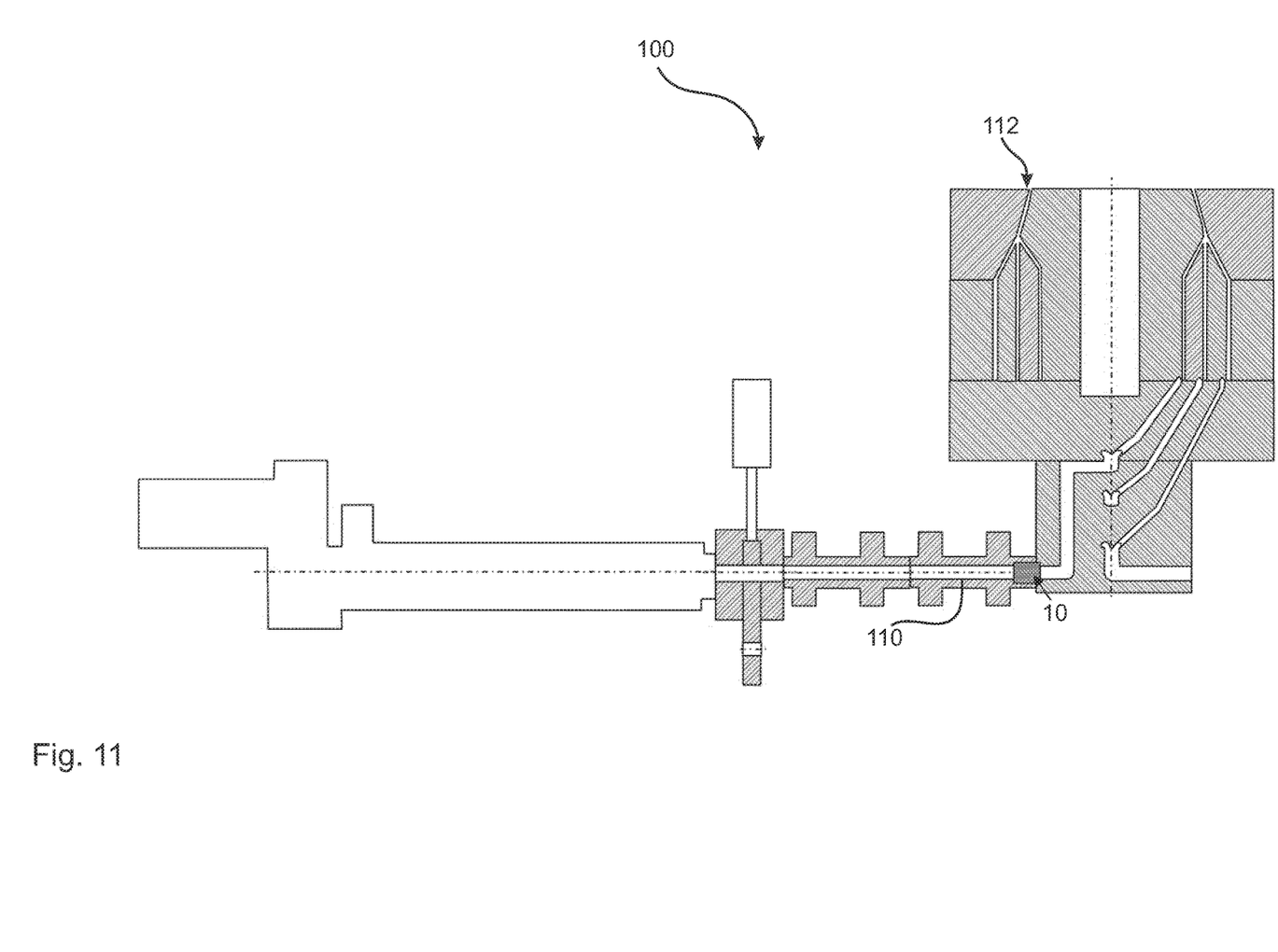

In FIG. 11 it is represented how an overturning device 10 can be assembled in a melt channel 110 and a blow head 100. Thereby, each described embodiment of the overturning device 10 can be comprised. The blow head comprises, thereby, a circumferential blow outlet 112.

The previous description of the embodiments describes the present invention only within the scope of examples. Naturally, single features of the embodiments as far as technically meaningful can be freely combined to one another without leaving the scope of the present invention.

REFERENCE LIST 10 overturning device
20 melt inlet
22 center of the melt inlet
24 edge of the melt inlet
30 melt outlet
32 center of the melt outlet
34 edge of the melt outlet
40 melt guidance means
42 first guidance channel
42a guidance opening
42b guidance outlet
42c ring distributor
44 second guidance channel
44a guidance opening
44b guidance outlet
44c ring collector
49 deflection section
70 free flow area
100 blow head
110 melt channel
112 blow outlet
200 molten material
210 new molten material
220 old molten material
SB collection width
OB opening width
VB distribution width
α setting angle

What is claimed is:

1. An overturning device for overturning a molten material in a melt channel comprising a melt inlet and a melt outlet, wherein between the melt inlet and the melt outlet at least one melt guidance means is assembled for a rearrangement of the molten material from the center of the melt inlet to the edge of the melt outlet and for a rearrangement of the molten material from the edge of the melt inlet into the center of the melt outlet, wherein the at least one melt guidance means comprises a first guidance channel with a guidance opening in the center of the melt inlet and at least one guidance outlet at the edge of the melt outlet, and wherein the at least one melt guidance means comprises a second guidance channel with a guidance outlet at the center of the melt outlet and at least a guidance opening at the edge of the melt inlet, wherein the first guidance channel and the second guidance channel comprise within the course a deflection section with a setting angle towards the flow direction of the molten material in at least one melt guidance means of less than 90°, wherein the guidance opening of the second guidance channel is fluid communicating connected with a ring collector which is assembled mainly at the entire perimeter of the melt inlet wherein the guidance opening and the guidance outlet comprise a completely enclosing geometry.

2. The overturning device according to claim 1, wherein
the ring collector comprises a collector width which is configured larger than the opening width of the guidance opening of the second guidance channel.

3. The overturning device according to claim 1, wherein
the guidance outlet of the first guidance channel is fluid communicating connected with a ring distributor which is assembled mainly entirely at the perimeter of the melt outlet.

4. The overturning device according to claim 3, wherein
the ring distributor comprises a distribution width which is configured larger than the opening width of the guidance outlet of the first guidance channel.

5. The overturning device according to claim 1, wherein
the melt inlet, the melt outlet, and at least one melt guidance means are configured free of dead space.

6. The overturning device according to claim 1, wherein
the cross section of a free flow area of at least the melt inlet or the melt outlet is in one of the following relations to the length of the overturning device in flow direction:
1:1
40:50
32:40
20:30.

7. The overturning device according to claim 1, wherein
between the melt inlet and the melt outlet in the area of the at least one melt guidance means an outer diameter is configured for a free flow area in the at least one melt guidance means which corresponds or mainly corresponds to the free flow area in at least the melt inlet or the melt outlet.

8. The overturning device according to claim 1, wherein
the deflection section has said setting angle towards the flow direction of the molten material in at least one melt guidance means in the area of 70°.

9. The overturning device according to claim 1, wherein
the at least one melt guidance means is configured for a pressure increase of the molten material about a factor in the area between approximately 5 and approximately 20.

10. The overturning device according to claim 1, wherein
at least the at least one melt guidance means, the melt inlet, or the melt outlet are at least sectionally covered with a protection coating.

11. The overturning device according to claim 1, wherein
at least the at least one melt guidance means, the melt inlet or the melt outlet are configured by a constructive method.

12. A blow head for performing a blow head extrusion method comprising at least one melt channel for the conveyance of molten material to a blow outlet of the blow head,
wherein
in the at least one melt channel at least one overturning device for overturning a molten material in a melt channel comprising a melt inlet and a melt outlet, wherein between the melt inlet and the melt outlet at least one melt guidance means is assembled for a rearrangement of the molten material from the center of the melt inlet to the edge of the melt outlet and for a rearrangement of the molten material from the edge of the melt inlet into the center of the melt outlet, is assembled, wherein the at least one melt guidance means comprises a first guidance channel with a guidance opening in the center of the melt inlet and at least one guidance outlet at the edge of the melt outlet, and wherein the at least one melt guidance means comprises a second guidance channel with a guidance outlet at the center of the melt outlet and at least a guidance opening at the edge of the melt inlet, wherein the first guidance channel and the second guidance channel comprise within the course a deflection section with a setting angle towards the flow direction of the molten material in at least one melt guidance means of less than 90°, wherein the guidance opening of the second guidance channel is fluid communicating connected with a ring collector which is assembled mainly at the entire perimeter of the melt inlet, wherein the guidance opening and the guidance outlet comprise a completely enclosing geometry.

13. A method for the performance of a purge process in an extrusion device, comprising the following steps:
introducing a molten material in a melt inlet in an overturning device for overturning a molten material in a melt channel comprising a melt inlet and a melt outlet, wherein between the melt inlet and the melt outlet at least one melt guidance means is assembled for a rearrangement of the molten material from the center of the melt inlet to the edge of the melt outlet and for a rearrangement of the molten material from the edge of the melt inlet into the center of the melt outlet is assembled, wherein the at least one melt guidance means comprises a first guidance channel with a guidance opening in the center of the melt inlet and at least one guidance outlet at the edge of the melt outlet, and wherein the at least one melt guidance means comprises a second guidance channel with a guidance outlet at the center of the melt outlet and at least a guidance opening at the edge of the melt inlet, wherein the first guidance channel and the second guidance channel comprise within the course a deflection section with a setting angle towards the flow direction of the molten material in at least one melt guidance means of less than 90°, wherein the guidance opening of the second guidance channel is fluid communicating connected with a ring collector which is assembled mainly at the entire perimeter of the melt inlet, wherein the guidance opening and the guidance outlet comprise a completely enclosing geometry;
rearrangement of molten material from the center of the melt inlet to the edge of a melt outlet of the overturning device and
rearrangement of molten material from the edge of the melt inlet into the center of the melt outlet.

14. The Overturning device according to claim 5, wherein
the melt inlet, the melt outlet, and at least one melt guidance means are configured free of dead space.

15. The Overturning device according to claim 10, wherein the protection coating comprises nickel.

16. The Overturning device according to claim 11, wherein the whole overturning device is configured by a constructive method.

* * * * *